US011620653B2

(12) United States Patent
Liu et al.

(10) Patent No.: US 11,620,653 B2
(45) Date of Patent: Apr. 4, 2023

(54) SYSTEMS AND METHODS FOR CONFIGURING AND IMPLEMENTING A MALICIOUS ACCOUNT TESTING MACHINE LEARNING MODEL IN A MACHINE LEARNING-BASED DIGITAL THREAT MITIGATION PLATFORM

(71) Applicant: Sift Science, Inc., San Francisco, CA (US)

(72) Inventors: Wei Liu, San Francisco, CA (US); Kevin Lee, San Francisco, CA (US); Hui Wang, San Francisco, CA (US); Rishabh Kothari, San Francisco, CA (US); Helen Marushchenko, San Francisco, CA (US)

(73) Assignee: Sift Science, Inc., San Francisco, CA (US)

( * ) Notice: Subject to any disclaimer, the term of this patent is extended or adjusted under 35 U.S.C. 154(b) by 0 days.

(21) Appl. No.: 17/872,768

(22) Filed: Jul. 25, 2022

(65) Prior Publication Data

US 2022/0366422 A1 Nov. 17, 2022

Related U.S. Application Data

(63) Continuation of application No. 17/379,068, filed on Jul. 19, 2021, now Pat. No. 11,429,974.

(Continued)

(51) Int. Cl.
*G06Q 40/00* (2023.01)
*G06Q 20/40* (2012.01)
(Continued)

(52) U.S. Cl.
CPC ......... *G06Q 20/4016* (2013.01); *G06F 17/18* (2013.01); *G06N 20/00* (2019.01)

(58) Field of Classification Search
CPC ..... G06Q 20/4016; G06N 20/00; G06F 17/18
See application file for complete search history.

(56) References Cited

U.S. PATENT DOCUMENTS 5,819,226 A * 10/1998 Gopinathan ......... G06Q 40/025
705/44
6,330,546 B1 * 12/2001 Gopinathan ........... G06Q 40/00
705/38

(Continued)

FOREIGN PATENT DOCUMENTS

WO WO-2022005913 A1 * 1/2022

OTHER PUBLICATIONS

Visa Public White Paper, "Anti-Enumeration and Account Testing Best Practices for Merchants," White Paper, Payment Fraud Disruption, V1.0, Sep. 2020 (Year: 2020).*

(Continued)

*Primary Examiner* — Abhishek Vyas
*Assistant Examiner* — William B. Bunker
(74) *Attorney, Agent, or Firm* — Chandler Scheitlin; Padowithz Alce; Alce PLLC

(57) ABSTRACT

Systems and methods for detecting digital abuse or digital fraud that involves malicious account testing includes implementing a machine learning threat model that predicts malicious account testing using misappropriate accounts, wherein a subset of a plurality of learnable variables of an algorithmic structure of the machine learning threat model includes one or more learnable variables derived based on feature data indicative of malicious account testing; wherein implementing the machine learning threat model includes: (i) identifying event data from an online event that is suspected to involve digital fraud or digital abuse, (ii) extracting adverse feature data from the event data that map to the one or more learnable variables of the subset, and (iii) providing the adverse feature data as model input to the (Continued)

Feature Selection and Installation machine learning threat model; and computing, using the machine learning threat model, a threat prediction indicating a probability that the online event involves malicious account testing.

19 Claims, 5 Drawing Sheets

Related U.S. Application Data

(60) Provisional application No. 63/149,080, filed on Feb. 12, 2021, provisional application No. 63/053,623, filed on Jul. 18, 2020.

(51) Int. Cl.
*G06F 17/18* (2006.01)
*G06N 20/00* (2019.01)

(56) References Cited

U.S. PATENT DOCUMENTS

| | | |
|---|---|---|
| 10,997,596 B1 | 5/2021 | Thomas et al. |
| 2011/0022483 A1 | 1/2011 | Hammad |
| 2011/0238510 A1* | 9/2011 | Rowen ............... G06V 40/382 |
| | | 705/16 |
| 2014/0304158 A1 | 10/2014 | Basu et al. |
| 2014/0324699 A1 | 10/2014 | Ding et al. |
| 2015/0161609 A1 | 6/2015 | Christner |
| 2017/0024828 A1* | 1/2017 | Michel ................ G06Q 40/12 |
| 2017/0200164 A1 | 7/2017 | Choi et al. |
| 2017/0337599 A1 | 11/2017 | Haceaturean et al. |
| 2017/0357977 A1 | 12/2017 | Pitz et al. |
| 2019/0087820 A1 | 3/2019 | Groarke et al. |
| 2019/0228419 A1 | 7/2019 | Sampath |
| 2019/0236610 A1* | 8/2019 | Sadaghiani ........... G06F 16/285 |
| 2020/0151628 A1 | 3/2020 | Zoldi et al. |
| 2021/0201319 A1 | 7/2021 | Vinayagam et al. |
| 2021/0233088 A1* | 7/2021 | Mehrotra .............. G06Q 20/22 |
| 2021/0279731 A1 | 9/2021 | Agrawal et al. |
| 2021/0334822 A1 | 10/2021 | Pati et al. |
| 2021/0357941 A1* | 11/2021 | Fort ..................... G06Q 20/351 |
| 2022/0108331 A1* | 4/2022 | Thomson ............... G08B 13/22 |

OTHER PUBLICATIONS

Blog Home, "List of Credit Card Decline Codes Defined," PaySimple, https://web.archive.org, 2020 (Year: 2020).*
Anonymous, "Put BIN Attacks in the trash," https://www.fintechnews.org, 2019 (Year: 2019).*

* cited by examiner

Sourcing Indicative Data

SYSTEMS AND METHODS FOR CONFIGURING AND IMPLEMENTING A MALICIOUS ACCOUNT TESTING MACHINE LEARNING MODEL IN A MACHINE LEARNING-BASED DIGITAL THREAT MITIGATION PLATFORM

CROSS-REFERENCE TO RELATED APPLICATIONS

This application is a continuation of U.S. patent application Ser. No. 17/379,068, filed 19 Jul. 2021, which claims the benefit of U.S. Provisional Application No. 63/053,623, filed 18 Jul. 2020, and U.S. Provisional Application No. 63/149,080, filed 12 Feb. 2021, which are incorporated in their entireties by this reference.

TECHNICAL FIELD

This invention relates generally to the digital fraud and abuse field, and more specifically to a new and useful system and method for detecting digital fraud or digital abuse and evolving underlying machine learning models in the digital fraud and abuse field.

BACKGROUND

The modern web and Internet enable entities to engage and perform an incalculable number of activities. Many of these activities involve user-to-user activities, user-to-business activities (or the reverse), and the like. These activities between users and between users and organizational entities over the web often involve the access, use, and/or exchange of information by one or more of the parties of the activities. Because of the malleable nature of the digital realm that these activities operate within, there arise a countless number of digital threats by digital actors that aim to commit digital fraud and/or digital abuse using online services and/or Internet-accessible applications (e.g., web or mobile applications). Additionally, some of these bad digital actors may also aim to misappropriate the information (e.g., hack) being exchanged between legitimate entities to these activities. These digital threats may also be perpetrated by malicious third parties who seek to unlawfully or otherwise, impermissibly take advantage of the data or information that is exchanged or, if not exchanged, data or information about the activities or actions of users and/or businesses on the web.

Other digital threats involving a malicious party or a bad digital actor that acts unilaterally (or in concert with other malicious actors) to abuse digital resources of a service provider to perpetrate fraud or other unlawful activities that are also of significant concern to legitimate service providers and users of the Internet.

While there may currently exist some technologies that attempt to detect digital fraud and digital abuse or other malicious digital activities over the Internet, these existing technology implementations may not sufficiently detect malicious digital activities over the Internet with accuracy and in real-time to provide an opportunity for an appropriate response by an affected party. Additionally, these existing technology implementations lack the capabilities to detect new and/or never been encountered before digital threats and automatically (or near automatically) evolve the technology implementation to effectively respond and neutralize the digital threats.

Therefore, there is a need in the digital fraud and abuse field for a digital fraud and abuse solution that enables effective detection of multiple and specific digital threats involving digital fraud and/or digital abuse via digital resources of a service provider. The embodiments of the present application described herein provide technical solutions that address, at least, the need described above.

SUMMARY OF THE INVENTION(S)

In one embodiment, a machine learning-based method for detecting digital abuse or digital fraud that involves malicious account testing includes implementing a machine learning threat model that predicts malicious account testing using misappropriate accounts, wherein a subset of a plurality of learnable variables of an algorithmic structure of the machine learning threat model includes one or more learnable variables derived based on feature data indicative of malicious account testing; wherein implementing the machine learning threat model includes: (i) identifying event data from an online event that is suspected to involve digital fraud or digital abuse, (ii) extracting adverse feature data from the event data that map to the one or more learnable variables of the subset, and (iii) providing the adverse feature data as model input to the machine learning threat model; and computing, using the machine learning threat model, a threat prediction indicating a probability that the online event involves malicious account testing.

In one embodiment, malicious account testing relates to a type of fraudulent online activity in which a malicious actor attempts to identify whether misappropriated financial account data or can be used to make an illicit online transaction.

In one embodiment, the threat prediction comprises a threat score value, and wherein the machine learning-based method further comprises: implementing an automated decisioning workflow comprising a plurality of threat evaluation stages that each include distinct criteria for evaluating at least the threat score, wherein each of the plurality of threat evaluation stages includes a distinct threat score range that, if satisfied, automatically informs a distinct disposition for the online event.

In one embodiment, the method includes identifying an adverse event signal within one or more corpora of event data, wherein the adverse event signal comprises a decline code for an associated online event, wherein the creating includes: extracting, from the one or more corpora of event data, a corpus of adverse feature data indicative of malicious account testing within a given event; and creating one or more criteria for each of the plurality of evaluation stages of the automated decisioning workflow based on the corpus of adverse feature data.

In one embodiment, the method includes constructing the machine learning threat model based on the one or more learnable variables derived based on feature data indicative of malicious account testing, wherein the constructing includes: selecting a pre-existing machine learning model that performs a cognate machine learning task of predicting digital fraud or digital abuse; and augmenting an algorithmic structure of the pre-existing machine learning model with the one or more learnable variables derived based on feature data indicative of malicious account testing.

In one embodiment, the method includes constructing the machine learning threat model based on the one or more learnable variables derived based on feature data indicative of malicious account testing, wherein the constructing includes: selecting an agnostic machine learning model that predicts a threat score that is agnostic to a specific type of digital fraud or digital abuse; and augmenting an algorithmic structure of the agnostic machine learning model with the one or more learnable variables derived based on feature data indicative of malicious account testing.

In one embodiment, the method includes defining the one or more learnable variables based on identifying an adverse event signal within one or more corpora of event data, wherein the adverse event signal comprises a decline code for an associated event, wherein the creating includes: extracting, from the one or more corpora of event data, a corpus of adverse feature data indicative of malicious account testing within a given event; and creating the one or more learnable variables based on the corpus of adverse feature data.

In one embodiment, the decline code relates to a subscriber-generated value or rationale for blocking or not accepting an attempt at an online transaction or other online activity.

In one embodiment, extracting adverse feature data from the event data includes identifying a number of transaction failures during a period for a single online user.

In one embodiment, extracting adverse feature data from the event data includes identifying a number of transaction failures during a period for a single internet protocol address.

In one embodiment, extracting adverse feature data from the event data includes identifying a number of distinct financial accounts used in failed online transactions.

In one embodiment, extracting adverse feature data from the event data includes identifying a number of failed online transaction per distinct financial account.

In one embodiment, extracting adverse feature data from the event data includes identifying a number of failed online transaction per bank identification number during a period.

In one embodiment, identifying event data from the online event that is suspected to involve digital fraud or digital abuse includes: receiving, via an application programming interface, the event data together with a decline code indicating a likelihood that the online event involves digital fraud or digital abuse.

In one embodiment, a machine learning-based system for detecting and mitigating digital abuse or digital fraud that involves malicious account testing includes a distributed network of computers implementing a machine learning-based digital threat mitigation service that: implements a machine learning threat model that predicts malicious account testing using misappropriate accounts, wherein a subset of a plurality of learnable variables of an algorithmic structure of the machine learning threat model includes one or more learnable variables derived based on feature data indicative of malicious account testing; wherein implementing the machine learning threat model includes: (i) identifying event data from an online event that is suspected to involve digital fraud or digital abuse, (ii) extracting adverse feature data from the event data that map to the one or more learnable variables of the subset, and (iii) providing the adverse feature data as model input to the machine learning threat model; and computes, using the machine learning threat model, a threat prediction indicating a probability that the online event involves malicious account testing.

In one embodiment, the threat prediction comprises a threat score value, and wherein the machine learning-based method further comprises: implementing an automated decisioning workflow comprising a plurality of threat evaluation stages that each include distinct criteria for evaluating at least the threat score, wherein each of the plurality of threat evaluation stages includes a distinct threat score range that, if satisfied, automatically informs a distinct disposition for the online event.

DESCRIPTION OF THE PREFERRED EMBODIMENTS

Figure 1:
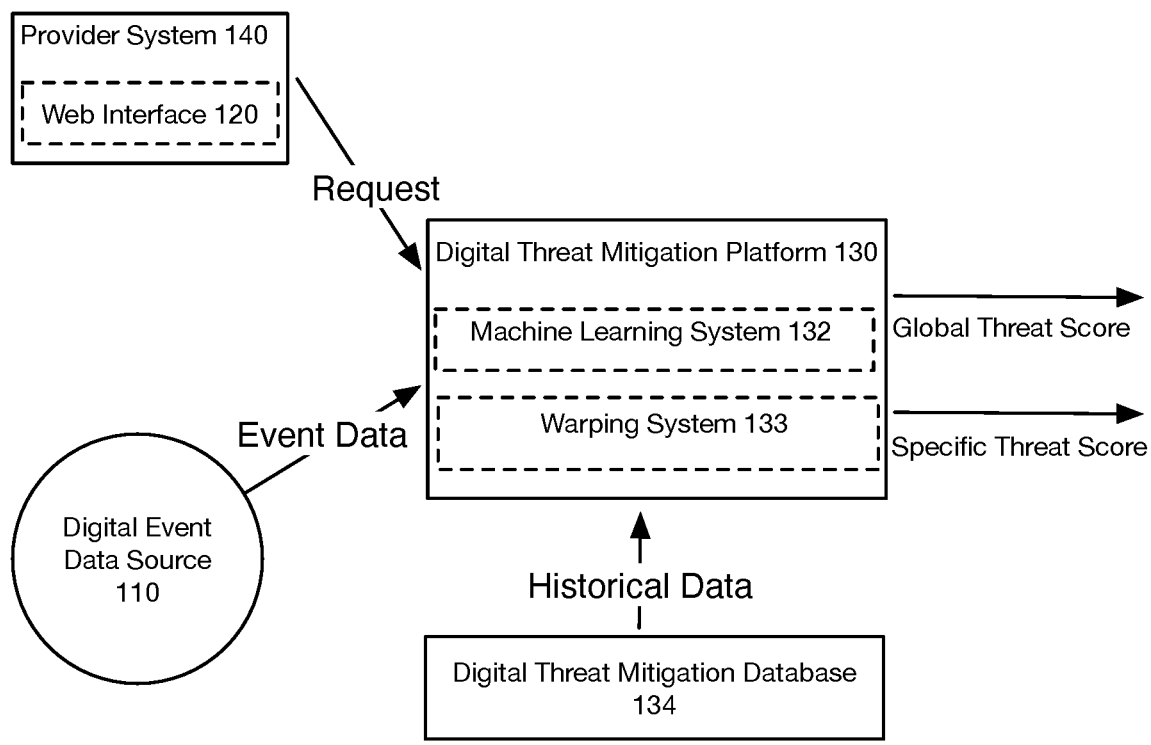
FIG. 1 illustrates a schematic representation of a system in accordance with one or more embodiments of the present application.

The following description of the preferred embodiments of the present application are not intended to limit the inventions to these preferred embodiments, but rather to enable any person skilled in the art to make and use these inventions.

Overview

As discussed above, digital threats are abounding and continue to evolve to circumvent existing digital fraud detection technologies. The evolving nature of digital threats compounded with the great number of transactions, events, actions, and/or activities (exceeding billions in number) occurring over the web and/or Internet highlight the many deficiencies of traditional digital fraud detection and threat mitigation implementations.

The embodiments of the present application, however, provide an advanced technology platform that is capable of ingesting billions of digital events and/or transactions over the Internet, the web, web applications, mobile applications, and the like and dynamically implement digital threat mitigation implementations that are capable of detecting malicious activities, fraudulent activities, digital abuses and generate digital threat mitigation recommendations and responses that operate to mitigate and/or eliminate the digital fraud and abuse threats stemming from the malicious or fraudulent activities, as described in U.S. Pat. No. 9,954,879, which is incorporated herein in its entirety by this reference.

The advanced technology platform of many embodiments of the present application employs a robust ensemble of machine learning models and related systems that operate to ingest the great number of digital activities performed and events occurring over the web. Accordingly, using these finely tuned and perpetually evolving and tunable machine learning models, a system implementing the several embodiments of the present application can predict a threat level and/or classify a digital threat with high accuracy and, in some embodiments, in real-time (e.g., as the event is occurring or shortly thereafter) compute a digital threat score for each event or activity that is received by the system.

The digital threat score may be exposed via a score application program interface (API) that may function to interact with various endpoints of the digital threat mitigation platform. Specifically, the score API may function to interact with one or more computing servers that implement the ensembles of machine learning models used to predict a likelihood of digital fraud and/or digital abuse. The score API may function to return a value (e.g., a number, likelihood or probability, or other criterion) that indicates how likely it is that an actor involved or associated with digital events and/or activities is a malicious actor or may be perpetrating cyber fraud or digital abuse (e.g., payment abuse, etc.). Accordingly, the digital threat score calculated by the score API may be used in several manners including to inform digital event data processing decisions (e.g., deny, hold, or approve digital transaction) or to define which of one or more digital threat mitigation protocols or implementations that should be applied to future digital event data and/or current the digital events to mitigate or eliminate a digital threat associated therewith.

1. System for Digital Fraud and/or Abuse Detection and Scoring

As shown in FIG. 1, a system 100 for detecting digital fraud and/or digital abuse includes one or more digital event data sources 110, a web interface 120, a digital threat mitigation platform 130, and a service provider system 140.

The system 100 functions to enable a prediction of multiple types of digital abuse and/or digital fraud within a single stream of digital event data. The system 100 provides web interface 120 that enables subscribers to and/or customers of a threat mitigation service implementing the system 100 to generate a request for a global digital threat score and additionally, make a request for specific digital threat scores for varying digital abuse types. After or contemporaneously with receiving a request from the web interface 120, the system 100 may function to collect digital event data from the one or more digital event data sources 110. The system 100 using the digital threat mitigation platform 130 functions to generate a global digital threat score and one or more specific digital threat scores for one or more digital abuse types that may exist in the collected digital event data.

The one or more digital event data sources 110 function as sources of digital events data and digital activities data, occurring fully or in part over the Internet, the web, mobile applications, and the like. The one or more digital event data sources 110 may include a plurality of web servers and/or one or more data repositories associated with a plurality of service providers. Accordingly, the one or more digital event data sources 110 may also include the service provider system 140.

The one or more digital event data sources 110 function to capture and/or record any digital activities and/or digital events occurring over the Internet, web, mobile applications (or other digital/Internet platforms) involving the web servers of the service providers and/or other digital resources (e.g., web pages, web transaction platforms, Internet-accessible data sources, web applications, etc.) of the service providers. The digital events data and digital activities data collected by the one or more digital event data sources 110 may function as input data sources for a machine learning system 132 of the digital threat mitigation platform 130.

The digital threat mitigation platform 130 functions as an engine that implement at least a machine learning system 132 and, in some embodiments, together with a warping system 133 to generate a global threat score and one or more specific digital threat scores for one or more digital abuse types. The digital threat mitigation platform 130 functions to interact with the web interface 120 to receive instructions and/or a digital request for predicting likelihoods of digital fraud and/or digital abuse within a provided dataset. The digital threat mitigation engine 130 may be implemented via one or more specifically configured web or private computing servers (or a distributed computing system) or any suitable system for implementing system 100 and/or method 200.

The machine learning system 132 functions to identify or classify features of the collected digital events data and digital activity data received from the one or more digital event data sources 110. The machine learning system 132 may be implemented by a plurality of computing servers (e.g., a combination of web servers and private servers) that implement one or more ensembles of machine learning models. The ensemble of machine learning models may include hundreds and/or thousands of machine learning models that work together to classify features of digital events data and namely, to classify or detect features that may indicate a possibility of fraud and/or abuse. The machine learning system 132 may additionally utilize the input from the one or more digital event data sources 110 and various other data sources (e.g., outputs of system 100, system 100 derived knowledge data, external entity-maintained data, etc.) to continuously improve or accurately tune weightings associated with features of the one or more of the machine learning models defining the ensembles.

The warping system 133 of the digital threat mitigation platform 130, in some embodiments, functions to warp a global digital threat score generated by a primary machine learning ensemble to generate one or more specific digital threat scores for one or more of the pluralities of digital abuse types. In some embodiments, the warping system 133 may function to warp the primary machine learning ensemble, itself, to produce a secondary (or derivative) machine learning ensemble that functions to generate specific digital threat scores for the digital abuse and/or digital fraud types. Additionally, or alternatively, the warping system 130 may function to implement a companion machine learning model or a machine learning model that is assistive in determining whether a specific digital threat score should be generated for a subject digital events dataset being evaluated at the primary machine learning model. Additionally, or alternatively, the warping system 133 may function to implement a plurality of secondary machine learning models defining a second ensemble that may be used to selectively determine or generate specific digital threat scores. Accordingly, the warping system 133 may be implemented in various manners including in various combinations of the embodiments described above.

The digital threat mitigation database 134 includes one or more data repositories that function to store historical digital event data. The digital threat mitigation database 134 may be in operable communication with one or both of an events API and the machine learning system 132. For instance, the machine learning system 132 when generating global digital threat scores and specific digital threat scores for one or more specific digital abuse types may pull additional data from the digital threat mitigation database 134 that may be assistive in generating the digital threat scores.

The ensembles of machine learning models may employ any suitable machine learning including one or more of: supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), adversarial learning, and any other suitable learning style. Each module of the plurality can implement any one or more of: a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, a linear discriminate analysis, etc.), a clustering method (e.g., k-means clustering, density-based spatial clustering of applications with noise (DBSCAN), expectation maximization, etc.), a bidirectional encoder representation form transformers (BERT) for masked language model tasks and next sentence prediction tasks and the like, variations of BERT (i.e., ULMFiT, XLM UDify, MT-DNN, SpanBERT, RoBERTa, XLNet, ERNIE, KnowBERT, VideoBERT, ERNIE BERT-wwm, GPT, GPT-2, GPT-3, ELMo, content2Vec, and the like), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial lest squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), unsupervised or supervised anomaly detection algorithms (e.g., isolation tree, clustering-based algorithms, statistical-based algorithms, classification-based algorithms, nearest-neighbor-based algorithms, and the like: k-NN, (cluster based) local outlier factor, connectivity-based outlier factor, parametric and non-parametric techniques, local density cluster-based outlier factor, and the like) and any suitable form of machine learning algorithm. Each processing portion of the system 100 can additionally or alternatively leverage: a probabilistic module, heuristic module, deterministic module, or any other suitable module leveraging any other suitable computation method, machine learning method or combination thereof. However, any suitable machine learning approach can otherwise be incorporated in the system 100. Further, any suitable model (e.g., machine learning models, non-machine learning models, etc.) may be implemented in the various systems and/or methods described herein.

The service provider 140 functions to provide digital events data to the one or more digital event data processing components of the system 100. Preferably, the service provider 140 provides digital events data to an events application program interface (API) associated with the digital threat mitigation platform 130. The service provider 140 may be any entity or organization having a digital or online presence that enable users of the digital resources associated with the service provider's online presence to perform transactions, exchanges of data, perform one or more digital activities, and the like.

The service provider 140 may include one or more web or private computing servers and/or web or private computing devices. Preferably, the service provider 140 includes one or more client devices functioning to operate the web interface 120 to interact with and/or communication with the digital threat mitigation engine 130.

The web interface 120 functions to enable a client system or client device to operably interact with the remote digital threat mitigation platform 130 of the present application. The web interface 120 may include any suitable graphical frontend that can be accessed via a web browser using a computing device. The web interface 120 may function to provide an interface to provide requests to be used as inputs into the digital threat mitigation platform 130 for generating global digital threat scores and additionally, specific digital threat scores for one or more digital abuse types. Additionally, or alternatively, the web (client) interface 120 may be used to collect manual decisions with respect to a digital event processing decision, such as hold, deny, accept, additional review, and/or the like. In some embodiments, the web interface 120 includes an application program interface that is in operable communication with one or more of the computing servers or computing components of the digital threat mitigation platform 130.

The web interface 120 may be used by an entity or service provider to make any suitable request including requests to generate global digital threat scores and specific digital threat scores. In some embodiments, the web interface 120 comprises an application programming interface (API) client and/or a client browser.

2. Machine Learning-Based Method for Identifying Card Testing Fraud

Figure 2:
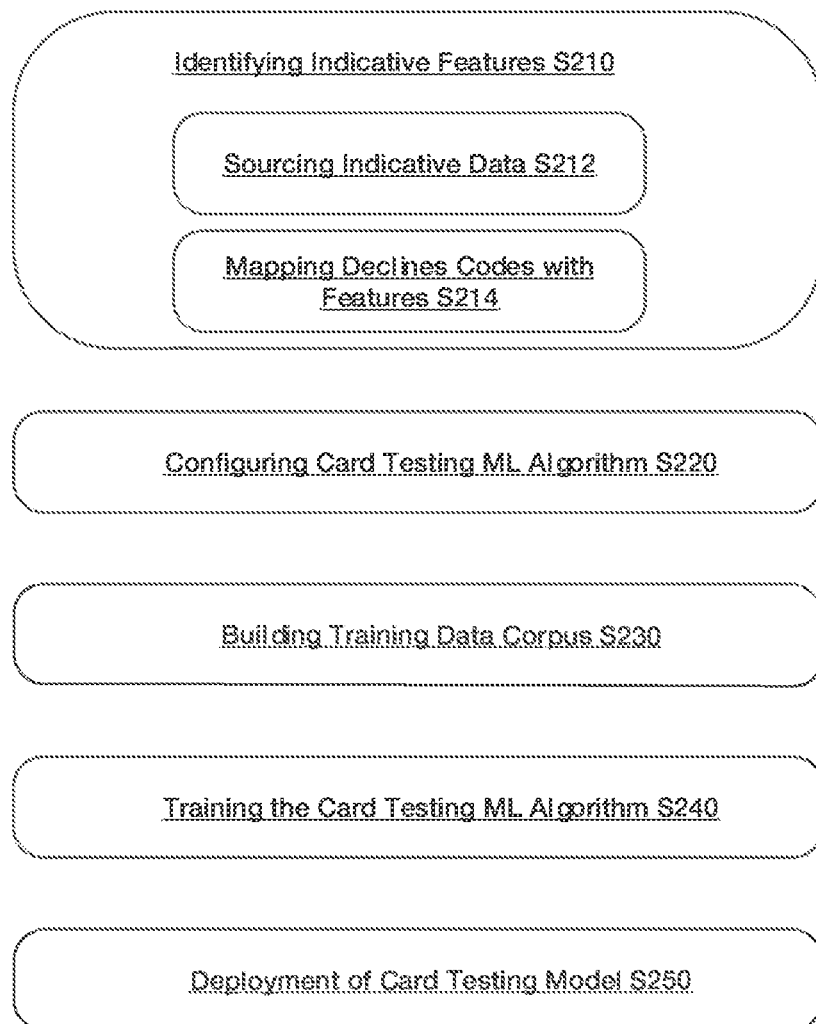
FIG. 2 illustrates an example method 200 in accordance with one or more embodiments of the present application.

As shown in FIG. 2, a method 200 for detecting digital fraud in the form of card testing using new features in one or more machine learning models includes identifying validating features for machine learning models S210, defining an algorithmic structure of a card testing machine learning algorithm S220, defining a corpus of card testing training data S230, training the card testing algorithm S240, and deployment of card testing machine learning model S250.

2.1 Identifying Indicative Features for Configuring a Card Testing ML Algorithm

Figure 3:
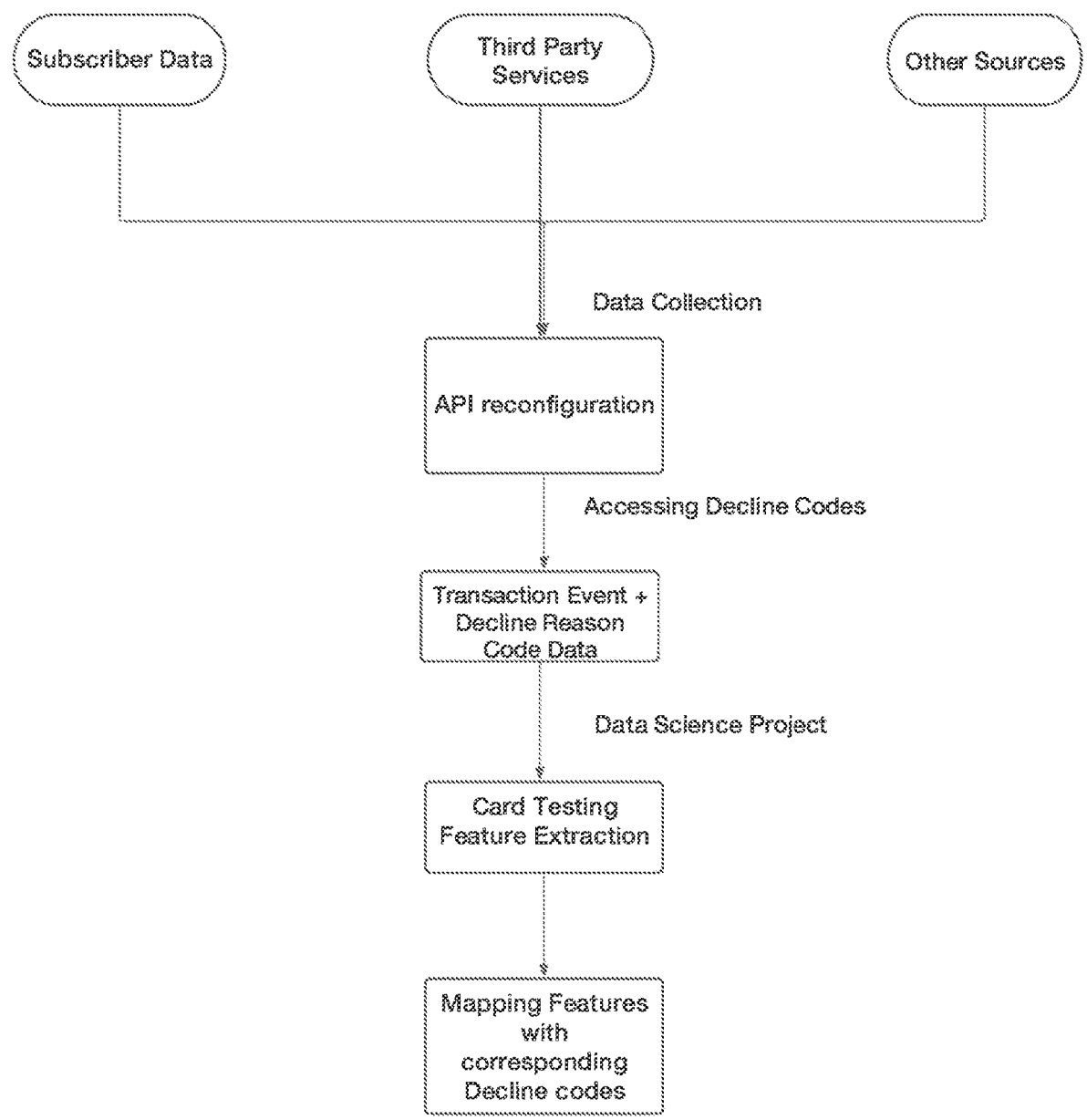
FIG. 3 illustrates a schematic example of a mixed block diagram for sourcing or collecting indicative data for extracting card testing features in accordance with one or more embodiments of the present application.

As shown in FIG. 3, S210, which includes identifying indicative feature data, may function to identify and/or source indicative feature data that supports an installation of one or more new algorithmic features in a machine learning algorithm that, once trained, may function to predict, or classify card testing events. In one or more embodiments, indicative (feature) data, as referred to herein, may relate to or include a corpus of sample data having features that may support a prediction or classification of card testing fraud and/or for informing similar machine learning tasks. In one or more embodiments, card testing or malicious account testing as referred to herein preferably relates to a type of fraudulent activity in which a malicious actor or the like attempts to identify whether a misappropriated card account data or financial account data can be used to make an illicit transaction.

2.1.2 Sourcing Indicative Data for Card Testing

S210 includes S212, which includes sourcing indicative data for card testing, may function to configure or re-configure a public application programming interface (API) (e.g., events API) to accept additional indicative data, such as a decline code or a decline reason. In such embodiments, the public API may include an interface at which subscribers to a threat mitigation service, providing the public API, may function to supply digital event data to the threat mitigation service. A decline code or a decline reason as referred to herein may include or relate to a subscriber-generated value or rationale or other adverse decisioning signal for blocking or not accepting an attempt at a transaction or other online activity (e.g., a content post, a purchase transaction, and/or the like) involving the subscriber (e.g., an online service provider or the like). In some embodiments, the decline code or the decline reason may be generated by a third-party integrated or third-party service provider of the subscriber. Alternatively stated, a decline code or decline reason may relate to a signal or probability of digital abuse or digital fraud (e.g., payment abuse, card testing, and/or the like).

In a preferred embodiment, the public API may be reconfigured to allow transaction decline reason codes to be placed in a way that increases their visibility or accessibility to the threat mitigation service. This may include but is not limited to placing transaction decline reason codes in the beginning or initial part of their respective payment method sub-field, placing transaction decline codes outside of other programming elements (e.g., nested loops), conspicuously including the transaction decline reason codes a part of the transaction event data and the like.

In a further implementation, S212 may function to source indicative data via experimentation and/or testing one or more historical corpora of event data. In such embodiments, S212 may function to analyze the one or more historical corpora of event data to expose features of the event data that highly correlate with card testing activity or the like.

2.1.4 Mapping Decline Reason Codes to Adverse Features|Learnable Variables

Figure 4:
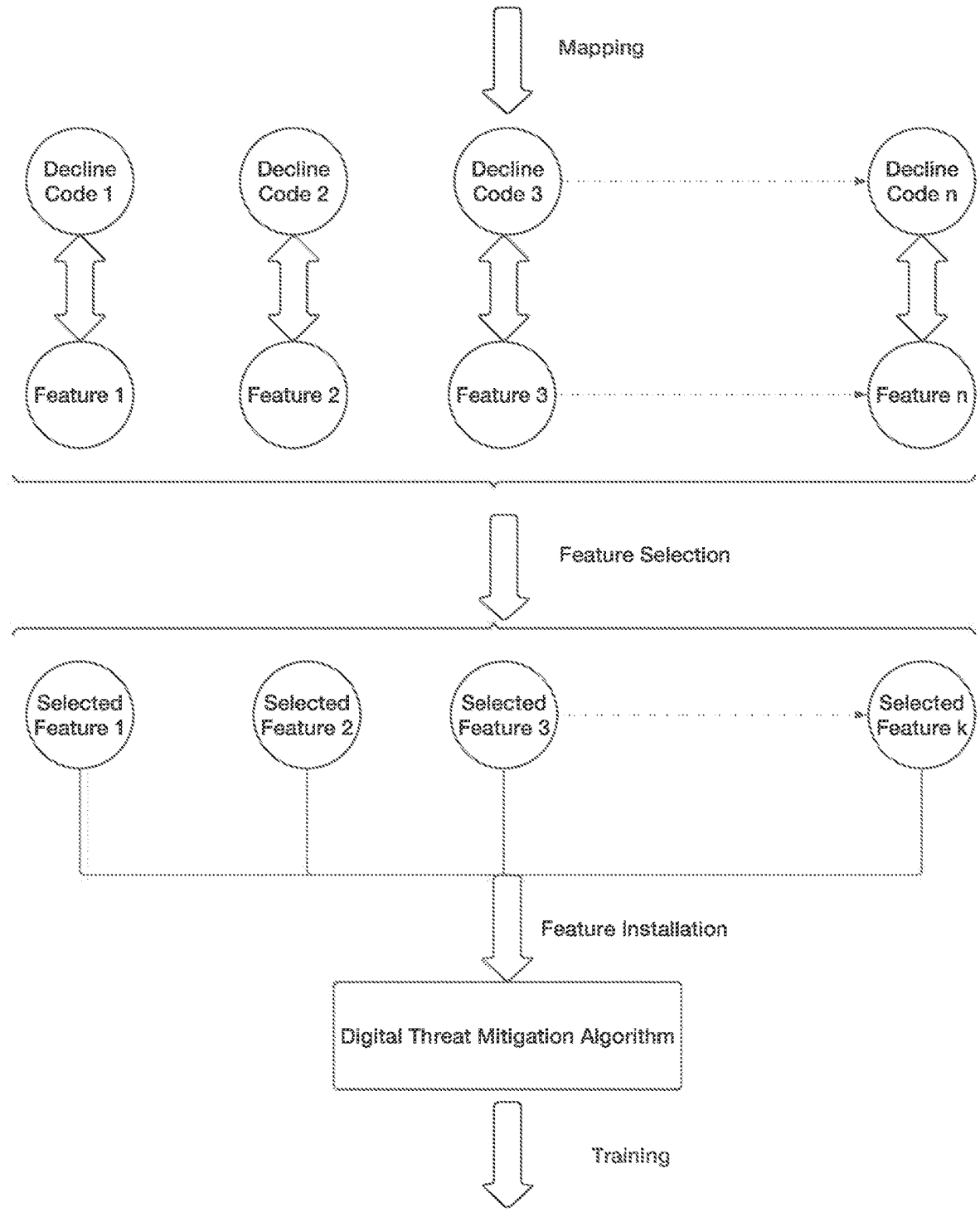
FIG. 4 illustrates a schematic example of a mixed block diagram adverse signal mapping and learnable feature selection in accordance with one or more embodiments of the present application.
Figure 5:
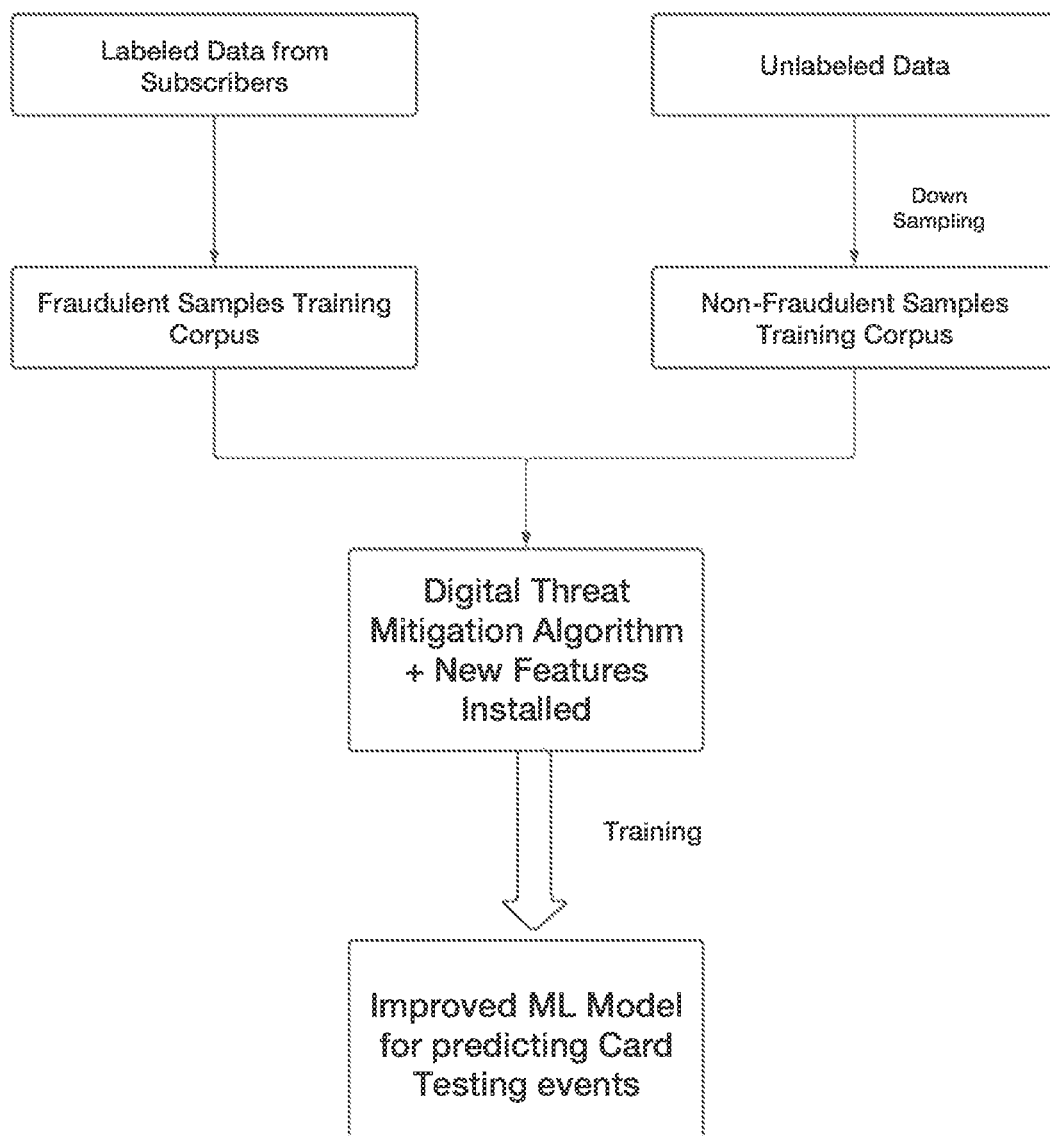
FIG. 5 illustrates a schematic example of a mixed block diagram that includes a training of a machine learning algorithm in accordance with one or more embodiments of the present application.

Additionally, or alternatively, S210 includes S214, which includes mapping decline codes to indicative features, may function to identify or generate a mapping between identified transaction decline reason codes to features or variables extracted from indicative data or event data, as shown by way of example in FIG. 4. In one or more embodiments, the mapping may enumerate one or more features of event data that drive or contribute to a computation of the associated transaction decline reason code.

In a preferred embodiment, the mapping may include only a subset of the decline codes that are most highly correlated with events in which card testing has been identified. In such preferred embodiment, S214 may function to identify one or more prevalent features of the mappings and select the prevalent features to be set as learnable variables/features for configuring a machine learning algorithm that may be used to predict or classify card testing in event data or the like.

2.2 Configuring a Card Testing ML Algorithm

S220, which includes defining an algorithmic structure of a card testing machine learning algorithm, may function to set one or more card testing learnable features/variables within an algorithmic structure of a machine learning algorithm that enables the machine learning algorithm, once trained, to identify or predict card testing and/or the like in event data or activity data. In one or more embodiments, S220 may function to select one or more learnable features for a card testing machine learning algorithm based on a mapping of a selected decline code or reason to one or more contributing features (as described in S210).

In a first implementation, S220 may function to one or more of a transfer learning and/or multi-task learning techniques or methods to rapidly enable a training of the machine learning algorithm to a single account/card testing prediction task or a multi-task predictions that includes at least account/card testing. Accordingly, S220 may function to select a machine learning algorithm in an algorithmically base form and preferably, transfer the algorithmic structure and associated learned weights for training on a new or cognate task of account/card testing. In this first implementation, S220 may function include in or augment the machine learning algorithm with a substantial number of or all new algorithmic/learnable variables for predicting card testing.

In a second implementation, S220 may function to select a partially or fully trained machine learning algorithm that may function to perform a cognate or related machine learning task (e.g., payment abuse machine learning model or the like). In such embodiments, S220 may function to install one or more new algorithmic features for predicting card testing alongside or along with the pre-existing algorithmic features of the partially/fully trained cognate machine learning model. In a third implementation, S220 may function to select an algorithmically pre-configured machine learning algorithm without trained variables (e.g., weights or coefficients are in a base or starting form) for performing a cognate or related task.

In a preferred embodiment of the second implementation, S220 may function to select a global machine learning algorithm, which may in some embodiments be used to implement a global machine learning model for predicting threat scores. In such preferred embodiment, the global machine learning algorithm may be agnostic to a specific type of fraud, such as card testing, and preferably, generates a general threat score indicating a level or a degree of risk of digital fraud or digital abuse of a given event or activity.

In a preferred embodiment, S220 may function to set a first learnable variable into a machine learning algorithm that, once trained, may function to predict a digital abuse or digital fraud, such as card testing, based on input of feature data extracted. In such preferred embodiment, the first learnable variable may include an adverse signal variable (e.g., signal feature, adverse event signal, etc.) relating to an identification or an extraction of a decline code or a potential decline reason from the event or activity data. For instance, in one or more embodiments, S220 may function to define or configure a decline code learnable variable as a new learnable component of the machine learning algorithm for predicting card testing and the like. The new learnable component of the algorithm during a training will acquire a weight or coefficient value indicating a degree, strength of signal, or a level of contribution of the adverse-signal feature or variable component of the learnable component to a prediction of the algorithm. As described previously, in some embodiments, the adverse-signal variable, such as a decline code or decline reason, may be generated, or computed by a subscriber to a service or system implementing the method 200.

Additionally, or alternatively, S220 may function to incorporate a plurality of additional learnable variables in the card testing machine learning algorithm. In some embodiments, a subset of the plurality of additional learnable variables may be more highly correlated with card testing than others.

In one implementation, in addition to a decline code learnable variable, S220 may function to employ one or more distinct learnable variables in which the variables/features may be highly correlated to a positive prediction of card testing. In one example, one of the one or more distinct learnable variables may include a number of failed transactions per credit card bank identification number (BIN) preferably, identified within a defined window of time or period. In such example, this learnable variable may capture signals across multiple users to give weight to or identify instances in which a user potentially misappropriating a card account may attempt card testing using the card account across multiple distinct subscribers (e.g., online service providers, online merchants, etc.).

In one or more preferred embodiments, one or more learning variables/features may be based on or informed by the number of failed transactions per IP address. This may be useful because a malicious actor may be attempting card testing for a plurality of card account numbers and merchants but may be making multiple attempts from a same workstation, computer, laptop, or other electronic device which would essentially have the same IP address.

S220 may function to include additional features without departing from the scope of the current invention including, but not limited to, a number of failed unique orders, a number of unique failed credit card numbers, a number of transaction failures per BIN preferably within a period, a number of transaction failures per geo location, a percentage of failed orders (per user/account BIN) within a minimum number of users of the account BIN and within a period of time.

S220 includes S222, which may function to configure one or more automated decisioning rules and/or one or more automated decisioning routes (e.g., accept, block, allow, review, etc.) of a subject automated decisioning workflow based on the identified learnable features for card testing. For example, one or more automated decisioning rules of a target workflow may be configured to identify instances in event data in which features of the event data indicate a number of failed transactions for an IP address or the like, which may be evaluated together with a computed machine learning-based threat score for the event. In such example, the automated decisioning workflow may function to route event data towards a block route, a review route, hold route, and/or a specific card testing route of the automated decisioning workflow. It shall be noted that S222 may function to use or implement any suitable indicative feature of card testing for configuring one or more automated decisioning rules and/or automated decision routes of a given automated decisioning workflow for improved handling of event data that may include card testing fraud or the like.

2.3 Define Training Data||Building the Training Data Corpus

S230, which includes identifying or defining a corpus of training data samples for training a card testing machine learning algorithm, may function to build or create a training corpus comprising event data having one or more decline codes and/or adverse signal data normally indicative of card testing. In one or more embodiments, the corpus of training data may include labeled and/or unlabeled training samples.

Global Training Corpus

In a first implementation, S230 may function to create a global training corpus for training a global machine learning algorithm and/or a card testing machine learning algorithm that includes training data samples sourced from a plurality of distinct sources and/or distinct subscribers. In this first implementation, a source of labeled training data may include, but is not limited to, event data or activity data provided by subscribers, users, third-party integrated partners and/or the like of a threat mitigation service or platform implementing the method 200 and the like. For instance, S230 may function to periodically collect in bulk or otherwise, event data or activity data that may be manually or automatically labeled by a subscriber to the threat mitigation service. In another example, S230 may function to collect labeled event data (e.g., chargeback data) from one or more third-party service providers of a subscriber, such as payment service providers. In such example, the collected labeled event data may include chargeback events or the like in which an amount charged to a credit card or other financial account may have been deemed fraudulent due to a misappropriation. Accordingly, the labeled event data may be available in various forms including but not limited to chargebacks data, manual review labels, and/or the like.

In one or more embodiments, a voluminous amount of training data for card testing may be unlabeled. In such embodiments, a corpus of unlabeled training data may include a combination of non-fraudulent and fraudulent event data samples, which may not be distinguished from each other. In such embodiments, S230 may function to downsample from the corpus of unlabeled training data and preferably, extracting the non-fraudulent or secure training data samples from the corpus for inclusion in the global training corpus.

Subscriber-Specific Training Corpus

In a second implementation, S230 may function to configure and/or build a global training corpus for training a card testing machine learning model that includes training data samples sourced from a plurality of distinct sources and/or distinct subscribers, S230 In a second implementation, S230 may function to configure or build a corpus of training data samples for training a subscriber-specific card testing machine learning model that includes training data samples sourced from a distinct subscriber and/or distinctly from subscriber-related activities. That is, in such embodiments, the corpus of training data samples for training a subscriber-specific card testing model may include training data samples sourced directly from the subscriber and/or indirectly from subscriber traffic (i.e., events and/or activities of users of the subscriber) the flow through the threat mitigation service. According to one or more embodiments, in use, the subscriber-specific card testing model may only be used for evaluating event data or activity data for the associated subscriber.

2.4 Training the Card Testing ML Algorithm

S240, which includes training the global machine learning algorithm and/or the card testing machine learning algorithm, may function to intelligently train the global machine learning algorithm or the card testing machine learning algorithm using one or more of a global training corpus and a subscriber-specific corpus of training data samples. In one embodiment, S240 may function to train a subject card testing or global machine learning algorithm according to a training/validation configuration of a subject training corpus. For instance, a portion or percentage of the training corpus may be designated for training and another portion or percentage of the training corpus may be designated for testing and/or validation of the card testing machine learning model. In such example, S240 may function to train the global or the card testing machine learning algorithm by sampling training samples from the training corpus until the training portion has been fully allocated. In such embodiments, S240 may function to subsequently test or validate the card testing machine learning model with the testing/validation portion of the training corpus.

Training with Subscriber-Specific Training Corpora

In a preferred embodiment, S240 may function to configure and/or train an instance of a card testing machine learning algorithm with a distinct set of subscriber training data samples. That is, in such embodiments, the corpus of training data for training a subscriber-specific card testing or global machine learning algorithm may include training data samples sourced directly from the subscriber and/or indirectly from subscriber traffic (i.e., events and/or activities of users of the subscriber) that flow through the threat mitigation service.

Additionally, or alternatively, S240 may function to collect and store the weights and/or coefficients computed during a training phase for each of the learnable features/variables of the subscriber-specific card testing machine learning algorithm.

Training with a Global Training Corpus

In a variant, S240 may function to configure and/or train a global card testing machine learning algorithm based on a global training corpus of training data samples sourced from a plurality of distinct sources and/or subscribers. that function to evaluate and/or predict fraud in event decision data for all or any subscriber to the threat mitigation service.

2.5 Deployment of Card Testing Model

S250, which includes deploying a trained card testing machine learning model or a trained global machine learning model augmented with card testing learnable features, may function to implementing a trained card testing machine learning model for identifying and/or classifying card testing events. In one or more embodiments, the card testing may be deployed in parallel or in series with the global threat scoring model (e.g., payment abuse scoring ML). In such embodiments, a global threat score identifying a general level of risk of threat, fraud, or digital abuse may be exposed together with a distinct classification and/or card testing threat that identifies a degree or a probability that an event or an event involves card testing or similar digital fraud threat.

Additionally, or alternatively, in one or more embodiments, a trained card testing machine learning model may be implemented independently of a global threat scoring model based on attributes of the event or activity data. In one example, if S250 identifies a decline code or decline reason that may be highly correlated (e.g., satisfying or exceeding a card testing correlation threshold or the like) in an inbound target event data, S250 may function to implement only the card testing machine learning model for predicting card testing in the target event data.

In one or more embodiments, S250 may function to include extracted card testing data features preferably using one or more feature extractors for extracting sets of features from event data or activity data. In such embodiments, S250 may function to pass the extracted features as model input data into one or more of a card testing machine learning model and global threat scoring model. The card testing machine learning model may function to compute a card testing threat score or a binary classification of card testing or no card testing.

In some embodiments, in which a subscriber employs one or more automated decisioning workflows, S250 may function to pass the card testing threat score and one or more features extracted from associated event data for computing, via the automated decisioning workflows, at least one automated disposal decision for handling or disposing of a subject event associated with the event data.

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

The system and methods of the preferred embodiment and variations thereof can be embodied and/or implemented at least in part as a machine configured to receive a computer-readable medium storing computer-readable instructions. The instructions are preferably executed by computer-executable components preferably integrated with the system and one or more portions of the processors and/or the controllers. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

As a person skilled in the art will recognize from the previous detailed description and from the figures and claims, modifications and changes can be made to the preferred embodiments of the invention without departing from the scope of this invention defined in the following claims.

We claim:

1. A machine learning-based method implemented on a fraud mitigation platform for detecting digital abuse or digital fraud that involves malicious card or account testing, the method comprising:

receiving, by a fraud mitigation platform server, digital event data that is indicative of card or account testing from a digital event data source via an application programming interface (API) in electronic communication with the digital event data source and the fraud mitigation platform server, wherein:
 (a) the digital event data includes a plurality of distinct digital transactions in which digital fraud or abuse is suspected;
 (b) the API is configured to receive a decline code or a decline reason associated with each distinct digital transaction of the plurality of distinct digital transactions;
 (c) the digital event data source is associated with one or more users of the fraud mitigation platform; and
 (d) the digital event data comprises one or more user-generated values or rationales for blocking a subset of the plurality of distinct digital transactions;

extracting, by the fraud mitigation platform server, adverse features which drive or contribute to a computation of the associated transaction decline code or the decline reason from the digital event data, wherein the extracting comprises:
 creating a decline code-feature mapping, wherein the decline code-feature mapping includes a digital mapping of a plurality of distinct digital event decline codes of one or more third-party payment service providers associated with the one or more users to a plurality of distinct machine learning model learnable features, wherein each distinct digital event decline code of the plurality of distinct digital event decline codes indicates a distinct rationale for preventing one or more subject digital events from occurring;
 selecting a subset of the adverse features that are correlated with card or account testing, wherein the selected features comprise learnable variables or features for configuring a machine learning algorithm that, when configured, predicts or classifies account or card testing;

using a training corpus of decline code-informed digital event data samples that correspond to the selected adverse features to train, via the fraud mitigation platform server, a machine learning threat model that predicts malicious account testing based at least on the decline code-feature mapping, wherein;
(1) the training corpus of decline-code informed digital event data samples includes a plurality of distinct labeled digital event data samples; and
(2) each distinct labeled digital event data sample of the plurality of distinct labeled digital event data samples comprises one or more pieces of decline code data;

implementing the machine learning threat model, wherein a subset of learnable features of a plurality of learnable features of an algorithmic structure of the machine learning threat model includes one or more of the plurality of distinct machine learning model learnable features of the decline code-feature mapping, wherein each of the one or more machine learning model learnable features supports a predictive accuracy of the machine learning threat model;

identifying, via a computer network, a target online event performed at one or more online services of a user; and based on identifying the target online event:
computing, using the machine learning threat model, a machine learning threat inference indicating a probability that the target online event involves malicious account testing based on features extracted from the target online event; and
computing, via the one or more computers, an automated disposal decision that enables a blocking or an allowance of the target online event based on the machine learning threat inference.

2. The method according to claim 1, wherein one learnable feature of the subset of learnable features is associated with identifying a number of digital transaction failures per bank identifying number (BIN) within a period.

3. The method according to claim 1, wherein one learnable feature of the subset of learnable features is associated with identifying a number of digital transaction failures per bank identifying number (BIN) within a period per internet protocol (IP) address.

4. The method according to claim 1, wherein
the machine learning threat inference comprises a threat score value, and
wherein the machine learning-based method further comprises:
implementing, by the one or more computers, a previously configured automated decisioning workflow comprising a plurality of threat evaluation stages that each include distinct criteria for evaluating at least the threat score value, wherein each of the plurality of threat evaluation stages includes a distinct threat score range that, if satisfied, automatically informs a distinct disposition for the target online event.

5. The method according to claim 1, further comprising:
identifying an adverse event signal within one or more corpora of event data, wherein the adverse event signal comprises a decline code for an associated online event, wherein the identifying the adverse event signal within the one or more corpora of event data includes:
extracting, from the one or more corpora of event data, a corpus of adverse feature data indicative of malicious account testing within a given event; and
creating one or more criteria for each of a plurality of evaluation stages of an automated decisioning workflow based on the corpus of adverse feature data.

6. The method according to claim 1, further comprising:
constructing the machine learning threat model based on the subset of learnable features, wherein the constructing includes:
selecting a pre-existing machine learning model that performs a cognate machine learning task of predicting digital fraud or digital abuse; and
augmenting an algorithmic structure of the pre-existing machine learning model with the subset of learnable features.

7. The method according to claim 1, further comprising:
constructing the machine learning threat model based on the subset of learnable features, wherein the constructing includes:
selecting an agnostic machine learning model that predicts a threat score that is agnostic to a specific type of digital fraud or digital abuse; and
augmenting an algorithmic structure of the agnostic machine learning model with the subset of learnable features.

8. The method according to claim 1, further comprising:
defining the subset of learnable features based on identifying an adverse event signal within one or more corpora of event data, wherein the adverse event signal comprises a decline code for an associated event, wherein defining the subset of learnable features includes:
extracting, from the one or more corpora of event data, a corpus of adverse feature data indicative of malicious account testing within a given event; and
creating the subset of learnable features based on the corpus of adverse feature data.

9. The method according to claim 8, wherein
the decline code further relates to a subscriber-generated value or rationale for blocking or not accepting an attempt at an online transaction or other online activity.

10. The method according to claim 1, wherein
malicious account testing relates to a type of fraudulent online activity in which a malicious actor attempts to identify whether misappropriated financial account data can be used to make an illicit online transaction.

11. The method according to claim 1, wherein the training corpus of decline code-informed digital event data samples further includes decline code-informed data samples corresponding to a plurality of distinct users subscribing to a machine learning-based digital threat mitigation service.

12. The method according to claim 1, wherein each decline code-informed digital event data sample of the training corpus of decline code-informed digital event data samples corresponds to a single subscriber subscribing to a machine learning-based digital threat mitigation service.

13. A machine learning-based method implemented on a fraud mitigation platform for detecting digital abuse or digital fraud that involves malicious card or account testing, the method comprising:
receiving, by a fraud mitigation platform server, digital event data that is indicative of card or account testing from a digital event data source via an application programming interface (API) in electronic communication with the digital event data source and the fraud mitigation platform server, wherein:
(a) the digital event data includes a plurality of distinct digital transactions in which digital fraud or abuse is suspected;

(b) the API is configured to receive a decline code or a decline reason associated with each distinct digital transaction of the plurality of distinct digital transactions;

(c) the digital event data source is associated with one or more users of the fraud mitigation platform; and (d) the digital event data comprises one or more user-generated values or rationales for blocking a subset of the plurality of distinct digital transactions;

extracting, by the fraud mitigation platform server, adverse features which drive or contribute to a computation of the associated transaction decline code or the decline reason from the digital event data, wherein the extracting comprises:

creating a decline code-feature mapping, wherein the decline code-feature mapping includes a digital mapping of a plurality of distinct digital event decline codes of one or more third-party payment service providers associated with the one or more users to a plurality of distinct machine learning model learnable features, wherein each distinct digital event decline code of the plurality of distinct digital event decline codes indicates a distinct rationale for preventing one or more subject digital events from occurring;

selecting a subset of the adverse features that are correlated with card or account testing, wherein the selected features comprise learnable variables or features for configuring a machine learning algorithm that, when configured, predicts or classifies account or card testing;

using a training corpus of decline code-informed digital event data samples that correspond to the selected adverse features to train, via the fraud mitigation platform server, a machine learning threat model that predicts malicious account testing based at least on the decline code-feature mapping, wherein;

(1) the training corpus of decline-code informed digital event data samples includes a plurality of distinct labeled digital event data samples; and (2) each distinct labeled digital event data sample of the plurality of distinct labeled digital event data samples comprises one or more pieces of decline code data; and implementing the machine learning threat model, wherein a subset of learnable features of a plurality of learnable features of an algorithmic structure of the machine learning threat model includes one or more of the plurality of distinct machine learning model learnable features of the decline code-feature mapping, wherein each of the one or more machine learning model learnable features supports a predictive accuracy of the machine learning threat model;

identifying, via a computer network, a target online event performed at one or more online services of a user; and based on identifying the target online event:

computing, using the machine learning threat model, a machine learning threat inference indicating a probability that the target online event involves malicious account testing based on features extracted from the target online event; and computing, via the one or more computers, an automated disposal decision that enables a blocking, a review, or an allowance of the target online event based on the machine learning threat inference.

14. The method according to claim 13, wherein
one of the features extracted from the target online event indicate a number of transaction failures during a period for a target internet protocol address used during the target online event.

15. The method according to claim 13, wherein
one of the features extracted from the target online event indicate a total number of transaction failures during a period for a target online user involved with the target online event.

16. The method according to claim 13, wherein
one of the features extracted from the target online event indicate a number of failed online transactions per distinct financial account.

17. The method according to claim 13, wherein
one of the features extracted from the target online event indicate a quantity of distinct financial accounts used in failed online transactions.

18. The method according to claim 13, wherein
the machine learning threat inference comprises a threat score value, and
wherein the machine learning-based method further comprises:

implementing, by the one or more computers, an automated decisioning workflow comprising a plurality of threat evaluation stages that each include distinct criteria for evaluating at least the threat score value, wherein each of the plurality of threat evaluation stages includes a distinct threat score range that, if satisfied, automatically informs a distinct disposition for the target online event.

19. The method according to claim 13, wherein
identifying the target online event includes:

receiving, via an application programming interface, the target online event together with a decline code associated with the target online event.

\* \* \* \* \*